Figure 3:
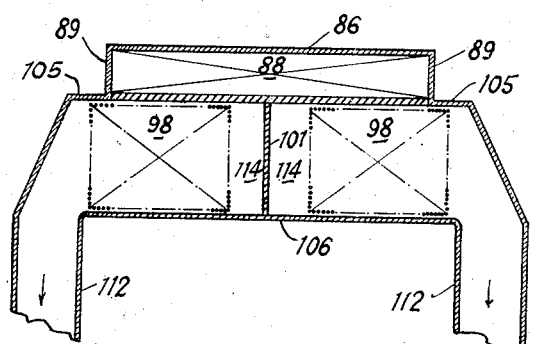

April 29, 1958 C. B. BAVER 2,832,571
FLUID HEATING APPARATUS
Original Filed Oct. 29, 1949

INVENTOR
*Clyde B. Baver*
BY
ATTORNEY

United States Patent Office 2,832,571
Patented Apr. 29, 1958

2,832,571

FLUID HEATING APPARATUS

Clyde B. Baver, Fanwood, N. J., assignor to The Babcock & Wilcox Company, New York, N. Y., a corporation of New Jersey Original application October 29, 1949, Serial No. 124,472, now Patent No. 2,683,590, dated July 13, 1954. Divided and this application July 12, 1954, Serial No. 442,503

5 Claims. (Cl. 257—241)

The present invention relates to the construction and operation of heat exchange apparatus of the type providing for the indirect transfer of heat from one fluid to another; an especially useful application of the invention being in connection with air heaters wherein the heating medium may be, for example, the hot gaseous products of combustion from a boiler furnace, while the medium to be heated may be the major portion of the air required for combustion of fuel within the furnace.

The present application is a division of the prior copending application Serial No. 124,472, filed October 29, 1949, now Patent No. 2,683,590, granted July 13, 1954.

In the conventional form of air heater wherein heat is transferred from combustion gases to combustion air, separate passages are provided through which the gases and air are directed in heat exchange relation, the transfer of heat from one fluid to the other taking place through metallic walls which separate the passages, and which walls may be provided by heat transfer elements in the form of spaced metal plates or, more generally, in the form of spaced metal tubes.

In an air heater wherein the heat exchange elements are provided by spaced metal tubes arranged in one or more banks, the heating fluid such as hot combustion gases may be directed through the tubes and thus through one set of passages, and the air directed over the outer surfaces of the tubes, and thus through a second set of passages provided between the tubes. A counterflow relation of air flow to gas flow is ordinarily maintained throughout the passages of any one bank, or succession of banks, for maximum rate of heat transfer from one fluid to the other. In the operation of such an air heater, it is known that those portions of the tube lengths adjacent the cold air inlet are subject to fairly rapid corrosion unless the air heater is operated so as to maintain all portions of the tubes adjacent the air inlet zone at temperatures high enough to prevent the condensation of vapors passing through the tubes.

The corrosive effect mentioned is generally the result of the condensation of water vapor carried by the heating gases flowing in contact with the metallic heat transfer surfaces, combined with the presence of a gaseous constituent such as sulphur dioxide resulting from combustion of the fuel by which the gases are generated. The condensation is promoted when the metal of the tubes, for example, adjacent the cooler gas exit end is compelled to operate at relatively low temperatures due to the continuous contact of cold inlet air with one surface of each heat transfer element or tube, and to the continuous contact of cooled gases with the opposite surface. Condensation of the aqueous vapor also maintains the low temperature surface in a moist condition which is conducive to the collection of dust particles on the surface and to the consequent decrease in heat transfer efficiency. When the heat transfer elements are provided by tubular members of relatively small diameter through which particle carrying gases are directed, such members are liable to become plugged and their effectiveness as heat transfer elements thus completely nullified. A similar effect results from the use of heat transfer elements formed as plates and arranged at relatively close spacings so as to define narrow gas flow passages therebetween.

The invention is therefore concerned with improvements in heat exchangers of the indirect heat transfer type arranged, for example, for heating combustion air by means of hot gases resulting from the combustion of fuel. Instead of employing the conventional counterflow arrangement of passages which results in gases of minimum temperature being brought into contact with heat transfer elements exposed to the entering cold air, there is provided a modified arrangement which, in addition to employing the counterflow principle, provides for gases of maximum temperature, or at least of intermediate temperature, to be directed into contact with heat transfer elements located adjacent the cold air inlet, thereby maintaining the metal of such elements at the cold end of the heater at temperatures high enough to minimize the condensation of vapors contacting therewith.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which a certain embodiment of the invention is illustrated and described.

Figures 1, 2:
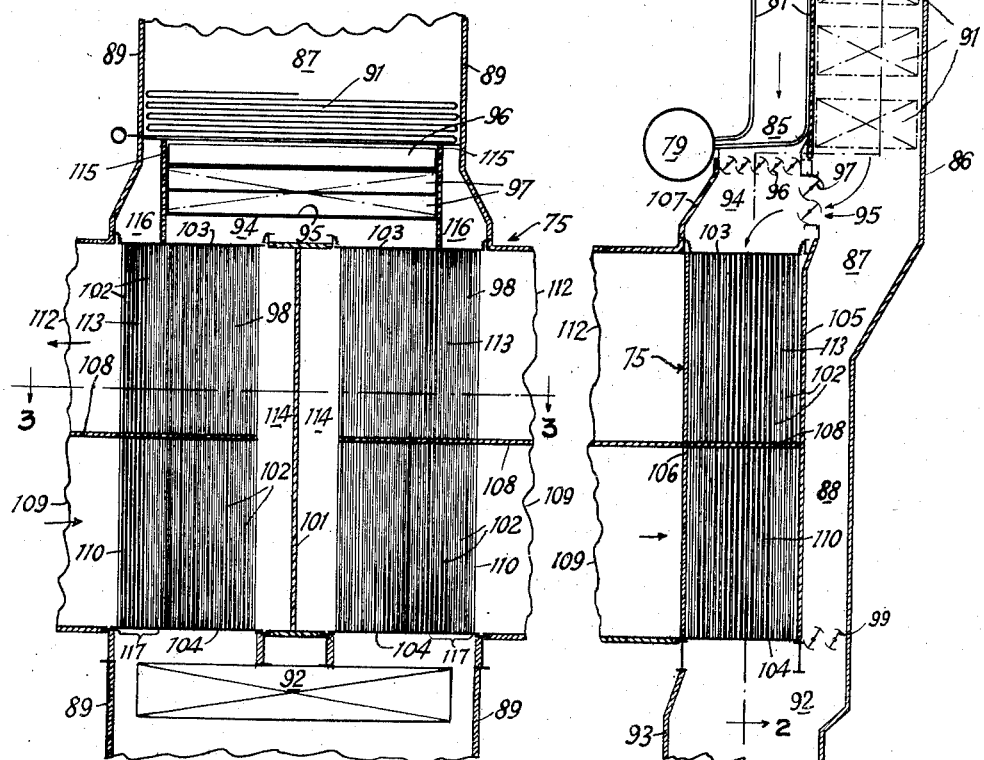

Of the drawings:

Fig. 1 is a sectional end elevation of fluid heaters arranged in accordance with the invention; and Figs. 2 and 3 are sectional side and plan views respectively of the fluid heater arrangement shown in Fig. 1, taken along lines 2—2 of Fig. 1, and 3—3 of Fig. 2 respectively.

As illustrated in the drawings, an air heater 75 is associated with fluid heating apparatus in the form of a water tube boiler 76 having heating surface in the path of heating gases from a fuel fired furnace, not shown. Gases discharged from the boiler are directed through air heater 75 for heating air required for the combustion of fuels in the boiler furnace. For the purposes of this disclosure, it may be assumed that boiler 76 and its associated furnace are in the same operative relation as shown for similar components in U. S. Patent 2,418,815, issued April 15, 1947 on my application filed March 20, 1942. The boiler and furnace thus combine to form a complete vapor generating unit having provision for heating air required for combustion of fuel supplied to the furnace, and for burning fuels of different calorific values simultaneously or at different times depending, for example, on the character of fuel available, or on the capacity at which the boiler is to be operated. In a manner similar to that disclosed in the patent, my present invention provides separated fluid heaters or fluid heater sections arranged to receive heating gases discharged from the boiler and through which the discharged gases are directed along series or parallel paths, as hereinafter more fully described.

The boiler 76, as partially illustrated herein, includes an upper and a lower drum 78 and 79, respectively, together with rows of upright tubes 81 which extend between the drums and have their opposite ends connected thereto. An upright wall 82, which constitutes the rear wall of the boiler setting, is arranged rearwardly of both drums 78 and 79 and defines therewith, at its opposite ends, an upper gas outlet 83 adjacent the boiler roof 84, and a lower gas outlet 85 arranged horizontally adjacent the lower drum 79 and above the air heater 75.

A second upright wall 86, rearwardly spaced from the setting wall 82, constitutes the rear wall of a heating gas flue 87 having its upper end portion in communication with the upper gas outlet 83 so as to receive heating gases discharged therethrough. Flue 87 is additionally defined by end walls 89 which are essentially continuations of correspondingly positioned gas directing walls of the boiler setting. A boiler feed water heater, or economizer 91, is positioned in an upper portion of flue 87, opposite the boiler 76. The lower portion of the flue is of reduced cross-section and continues downwardly as a gas bypass 88 to a point below air heater 75 where it is joined, through a dampered passage 92, to a gas outlet duct 93 having the usual outlet connection to an induced draft fan, not shown.

Air heater 75 is vertically separated from the boiler by a gas inlet space 94 which is open at its upper end to the lower boiler gas outlet 85, and through a side opening 95 to the upright flue 87, each of the openings 85 and 95 constituting gas inlet openings into the space 94, under control of damper means 96 and 97, disposed across the respective openings. The air heater as shown, comprises duplicate sections 98 separated by a common upright wall 101 extending at right angles to the flue wall 86. Each section 98 comprises a bank of horizontally spaced upright tubes 102 extending between and connected at opposite ends to upper and lower tube sheets 103 and 104. Side walls 105 and 106, together with tube sheets 103, 104 constitute walls by which air to be heated is directed across the tubes 102, the wall 105 also constituting the inner wall of the gas bypass 88. The gas inlet opening 95, from flue 87 to space 94 above the upper tube sheet 103, is thus formed between the upper end of air heater wall 105 and the lower end of boiler wall 82. A wall 107 extends upwardly from the inner margin of upper tube sheets 103 to the inner margin of the boiler gas outlet 85 to complete the boundary of gas inlet space 94.

A plate 108 extends across the tubes 102 of each air heater section, intermediate the upper and lower tube sheets 103 and 104 to provide two-pass flow of air through each air heater section. An air inlet duct 109 directs the cold air into the first pass 110 of each section, and an air outlet duct 112 conducts the heated air from the second pass 113 of each section, the air following a U-shaped path and turning from the first to the second air pass within the space 114 adjacent the central dividing wall 101.

The boiler gas outlet 85 opens into space 94 throughout the width of the space between end walls 89, whereas the side opening 95 from flue 87 is open to space 94 only between upright walls 115 which are positioned at the ends of opening 95. The walls 115 thus partition the major central portion of space 94 from the smaller end portions 116 located adjacent the walls 89 which at this elevation diverge downwardly, so as to span the upper ends of all tubes 102 in both banks. The resulting end spaces 116 thus overlie the gas inlet ends of air heater tubes of each bank to the extent of about one-quarter to one-third of the total number of tube rows in the respective banks. The dampers 96 and 97 are restricted to the space between partition walls 115 in which they are supported. The end spaces 116 are thus continuously open to the boiler gas outlet 85, and to that source of gases only, whether or not the damper 96 or 97 is open or closed.

In the operation of the vapor generating unit illustrated in Figs. 1–3, when the unit is being fired with a fuel of relatively high calorific value such as pulverized coal or oil, for example, the damper means are regulated so as to direct the major portion of the boiler heating gases through the economizer 91 and air heater 75 in series, as disclosed in the aforesaid Patent No. 2,418,815. Accordingly, damper 96 is closed to block off gas discharge through the lower gas outlet 85, and damper 97 is opened to admit gases from flue 83 to the gas inlet space 94 above the air heater. The damper 99 in gas bypass duct 88 may be regulated as desired to provide suitable air outlet temperatures.

When the unit is being fired with a fuel of relatively low calorific value such as blast furnace gas, for example, the damper means are regulated so as to direct the boiler heating gases through the economizer and air heater in parallel, as also disclosed in the aforesaid Patent No. 2,418,815. For this condition, damper 96 is opened so as to permit a portion of the boiler gases to be discharged through the lower boiler outlet 85 direct to the air heater 75, while a second portion of the gases, which constitutes the remainder of the gases, is discharged through the upper boiler outlet 83 direct to the economizer 91. The damper 97 is closed so as to prevent gases being admitted from flue 87 into space 94 above the air heater. Damper 99 in the gas bypass 88 is maintained in open position for discharge of gases from flue 87 into the gas outlet duct 93.

It will be noted that for each condition of gas flow, that is, in series or in parallel through the economizer and air heater, a certain proportion of the total available heating gases is continuously discharged through the lower boiler gas outlet 85 into the end spaces 116 located above the upper inlet ends of air heater tubes 102 disposed in a limited number of rows 117 adjacent the outer side of each bank. Since all tubes 102 extend across both ducts 109 and 112, the tubes in the outer rows 117 serve to conduct gases at approximately the maximum temperature through tube portions which extend across the first air pass 110 in a region nearest the cold air inlet 109, thereby maintaining the metal of such tube portions at temperatures above the point at which condensation of vapor in the conducted gases is most likely to take place. In the second air pass 113, the gas inlet portions of tubes in rows 117 conduct the hottest gases in heat exchange relation to the hottest air, so that the temperature of the gases is not greatly reduced from its original maximum temperature before entering tube portions in the first air pass.

The bypassing of a portion of the hottest gases continuously through tube portions nearest the cold air inlet is particularly desirable when the main body of gases is directed through the economizer and air heater in series, since under this condition, the greater proportion of the gases entering the air heater are at temperatures appreciably lower than the initial gas temperature due to previous contact with economizer heating surface. A further advantage in bypassing gases direct from the boiler through air heater tubes nearest the cold air inlet results from the fact that the gas flow path thus provided is of considerably lower resistance than if such gases were derived from the series flow path, as gases discharged from the economizer, for example. The provision of the lower resistance path results in increased velocity of gas flow through tubes 117 which in turn increases the tube metal temperature of such tubes due to the increased rate of heat transfer to tube surface exposed to such gases.

While in accordance with the provisions of the statutes there is illustrated and described herein a selected embodiment of the invention now known to the inventor, those skilled in the art will understand that changes may be made in the form of apparatus disclosed without departing from the spirit of the invention covered by the claims, and that certain features of the invention may sometimes be used to advantage without a corresponding use of other features.

What is claimed is:

1. Heat exchange apparatus comprising a common source of hot gases, an air heater including a bank of spaced parallel tubes, means for continuously passing one portion of said hot gases through a first group of said tubes, means for partially cooling another portion of said gases to a temperature lower than the gases passing to said first group of tubes, means for regulably passing said partially cooled gases to a second group of said tubes for flow therethrough in parallel with said one portion of gases, means forming an outlet for the gases discharging from said bank of tubes, and means for passing air to be heated over at least a portion of the length of each tube of said first group before passing over said second group of tubes.

2. Heat exchange apparatus comprising a common source of hot gases, an air heater including a bank of spaced parallel tubes, means for continuously passing one portion of said hot gases through a first group of said tubes, means for partially cooling another portion of said gases to a temperature lower than the gases passing to said first group of tubes, means for regulably passing said partially cooled gases through a second group of said tubes, means forming an outlet for the gases discharging from said bank of tubes, and conduit means for passing air to be heated over at least a portion of the length of each tube of said first group before passing over said second group of tubes, said conduit means being arranged to pass air in counter and cross flow heat transfer relationship with the gases in said bank of tubes.

3. Heat exchange apparatus comprising a common source of hot gases, an air heater including a bank of spaced parallel tubes, means for continuously passing one portion of said hot gases through a first group of said tubes, means for partially cooling another portion of said gases to a temperature lower than the gases passing to said first group of tubes, means for regulably passing said partially cooled gases to a second group of said tubes for flow therethrough in parallel with said one portion of gases, means forming an outlet for the gases discharging from said bank of tubes, and conduit means for passing air to be heated in counter and cross flow heat transfer relationship with the gases in said bank of tubes, said conduit means including an air inlet arranged to direct air over a portion of the length of each tube of said first group before passing over said second group of tubes, and an air outlet arranged to receive air discharging over the remaining portion of the length of each tube of said first group.

4. Heat exchange apparatus comprising a common source of hot gases, an air heater including a bank of spaced parallel tubes arranged for gas flow therethrough, means for continuously passing one portion of said hot gases through a first group of said tubes, a heat absorbing device for partially cooling another portion of said gases to a temperature lower than the gases passing to said first group of tubes, conduit means for passing said partially cooled gases to a second group of said tubes, conduit means for by-passing said partially cooled gases around said second group of tubes, conduit means for passing one other portion of said gases to said second group of tubes at a temperature substantially the same as the temperature of the gases passing to said first group of tubes, dampers positioned in each of said conduit means and operable to provide heating gas flow through said heat absorbing device and said second group of tubes in series or in parallel or in any combination thereof, outlet means for the gases discharging from said bank of tubes and from said by-pass conduit means, and means for passing air to be heated over at least a portion of the length of each tube of said first group before passing over said second group of tubes.

5. Heat exchange apparatus comprising a common source of hot gases, an air heater including a bank of spaced parallel tubes arranged for gas flow therethrough, means for continuously passing one portion of said hot gases through a first group of said tubes, a heat absorbing device for partially cooling another portion of said gases to a temperature lower than the gases passing to said first group of tubes, conduit means for passing said partially cooled gases to a second group of said tubes, conduit means for by-passing said partially cooled gases around said second group of tubes, conduit means for passing one other portion of said gases to said second group of tubes at a temperature substantially the same as the temperature of the gases passing to said first group of tubes, dampers positioned in each of said conduit means and operable to provide heating gas flow through said heat absorbing device and said second group of tubes in series or in parallel or in any combination thereof, outlet means for the gases discharging from said bank of tubes and from said by-pass conduit means, and air conduit means for passing air to be heated in counter and cross flow heat transfer relationship with the gases in said bank of tubes, said air conduit means including an air inlet arranged to direct air over a portion of the length of each tube of said first group before passing over said second group of tubes, and an air outlet arranged to receive air discharging over the remaining portion of the length of each tube of said first group.

References Cited in the file of this patent

UNITED STATES PATENTS

| | | |
|---|---|---|
| 1,737,189 | Haber | Nov. 26, 1929 |
| 1,779,276 | Jacobus | Oct. 21, 1930 |

FOREIGN PATENTS

| | | |
|---|---|---|
| 454,408 | Germany | Jan. 7, 1928 |